L. A. HUSTON.
VEHICLE SPRING.
APPLICATION FILED OCT. 3, 1913.
Reissued Jan. 13, 1914. 13,676.
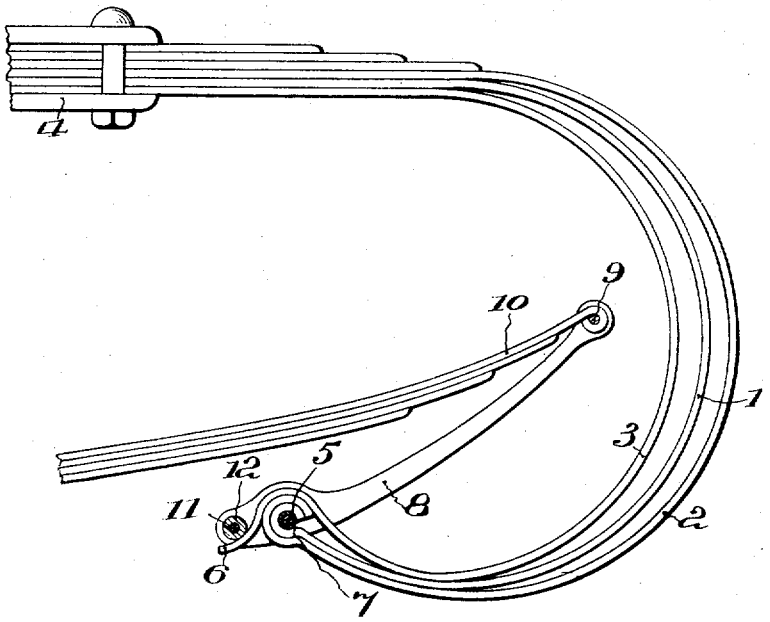
Inventor
Witnesses
James F. Fitz Gibbon.
G. M. Cooperhaver.
Lewis A. Huston
By Percy B. Hills
Attorney

UNITED STATES PATENT OFFICE.

LEWIS A. HUSTON, OF NEW YORK, N. Y.

VEHICLE-SPRING.

13,676. Specification of Reissued Letters Patent. Reissued Jan. 13, 1914.

Original No. 1,074,178, dated September 30, 1913, Serial No. 781,582. Application for reissue filed October 3, 1913. Serial No. 793,257.

*To all whom it may concern:*

Be it known that I, LEWIS A. HUSTON, a citizen of the United States, residing at New York, borough of Manhattan, State of New York, have invented certain new and useful Improvements in Vehicle-Springs; and I do hereby declare the following to be a full, clear, and exact description of the invention, such as will enable others skilled in the art to which it appertains to make and use the same.

My invention relates to springs for vehicles, and has for its object to provide certain improvements in the construction of the same as will be hereinafter more particularly described and claimed, reference being had to the accompanying drawing, in which the figure is a view partly in side elevation and partly in section of my improved device.

In the said drawing the reference numeral 1 denotes the central one of a series of three spring leaves, the outer and inner ones of which are indicated respectively at 2 and 3. Said leaves are brought together at their upper ends, where they are clipped at 4 to the vehicle body, and being curved on the arcs of circles, are gradually separated as they leave said vehicle body to a point substantially midway of their curvature, where they are most widely separated, and are then gradually brought into contact again near their lower ends, as shown. At their extreme lower ends the central leaf 1 is curved around a small bushing 5, the end of outer leaf 2 being curved around the curved end of leaf 1, while the end of inner leaf 3 is similarly curved around the curved end of leaf 2, but in the opposite direction, the whole forming what may be termed an interlocking eye connection with said bushing. Said leaf 3 is extended at its end into a tongue 6, for a purpose hereinafter to be described. Passing through said bushing 5 is a bolt 7 which connects said bushing with the free ends of the parallel arms of a bracket link 8, which is at its upper end pivoted at 9 to the outer end of the leaf spring 10 commonly used in automobiles. Said link 8 extends beyond the point of connection therewith of the bolt 7 and carries a transversely disposed anti-friction roller 11 mounted on a rod 12, against which the upper face of tongue 6 will contact. In order to provide means for preventing lateral displacement of the ends of the spring leaves with respect to the bushing 5, I preferably widen the parallel arms of bracket link 8 at 13 to inclose said interlocking eye, said widened portions also acting as dust guards.

In operation upon a relative movement of the parts toward each other there will be a slight movement of the ends of leaves 2 and 3 sliding oppositely around the end of the leaf 1, said leaves at the same time at their two points of separation increasing their surface of contact under the compression, thus stiffening the resistance offered in proportion to the load imposed.

An important feature of my invention is found in the tongue 6, which by its engagement beneath anti-friction roller 11 acts as a support for the lower end of bracket link 8 when the latter is disposed to any extent out of a vertical line, as is the case with the construction shown in the drawing, where the spring 10 is of considerable length. This feature adapts my device to be applied to automobiles previously equipped with other forms of springs, and enables the leaf springs 10 of said prior equipment to be utilized, no matter how long said springs 10 may be. A further and important function of said tongue 6 is to act as a cushion to neutralize small vibrations.

Having thus described my invention, what I claim and desire to secure by Letters Patent is:

1. A scroll spring for vehicles, embodying nested spring leaves gradually separating toward their centers, and formed at their outer ends with eyes that interlock to connect said ends with each other.

2. A scroll spring for vehicles, embodying nested spring leaves gradually separating toward their centers and formed at their outer ends into eyes that interlock to connect said ends to each other, and a leaf spring resiliently supporting said spring leaves from said interlocking eyes.

3. A scroll spring for vehicles, embodying nested spring leaves brought together at their ends and gradually separating toward their centers and formed at their outer ends into eyes that interlock to connect said ends to each other, and a leaf spring resiliently supporting said spring leaves from said interlocking eyes.

4. A scroll spring for vehicles, embodying nested spring leaves gradually separating toward their centers and formed at their outer ends into eyes that interlock to connect said ends to each other, a bracket link pivoted to said interlocking eyes, and a leaf spring resiliently supporting said bracket link.

5. A scroll spring for vehicles, embodying nested spring leaves gradually separating toward their centers, and formed at their outer ends with eyes that interlock to connect said ends with each other, a bracket link pivoted to said interlocking eyes intermediate its length, a tongue forming a continuation of one of said spring leaves and frictionally engaging the outer end of said bracket link to support and cushion the same, and a leaf spring resiliently supporting said bracket link.

6. A scroll spring for vehicles, embodying nested spring leaves brought together at their ends and gradually separating toward their centers, and formed at their outer ends with eyes that interlock to connect said ends with each other, a bracket link pivoted to said interlocking eyes intermediate its length, a tongue forming a continuation of one of said spring leaves and frictionally engaging the outer end of said bracket link to support and cushion the same, and a leaf spring resiliently supporting said bracket link.

7. A scroll spring for vehicles, embodying nested spring leaves gradually separating intermediate their length and with their faces normally in contact with each other upon opposite sides of their area of separation, and means for resiliently supporting said spring leaves at one end.

8. A scroll spring for vehicles, embodying nested spring leaves gradually separating intermediate their length and with their faces normally in contact with each other upon opposite sides of their area of separation, and a leaf spring resiliently supporting said spring leaves at one end.

9. A scroll spring for vehicles, embodying nested spring leaves gradually separating intermediate their length and with their faces normally in contact with each other upon opposite sides of their area of separation, a leaf spring, and a link connecting the free end of said leaf spring with the said spring leaves at one end.

In testimony whereof I affix my signature, in the presence of two subscribing witnesses.

LEWIS A. HUSTON.

Witnesses:

G. M. Huston,

E. H. Harvey.